United States Patent Office 3,298,823
Patented Jan. 17, 1967

3,298,823
METHOD FOR THE PRODUCTION OF ALLOYS
Cord H. Sump, Chattanooga, Tenn., assignor to W. R. Grace & Co., New York, N.Y., a corporation of Connecticut
No Drawing. Filed Feb. 8, 1966, Ser. No. 525,821
5 Claims. (Cl. 75—10)

This invention relates to an improvement in the production of alloys containing tungsten or molybdenum. In one specific embodiment, it relates to a method for preparing molybdenum silicides or tungsten silicides.

Alloys of molybdenum and tungsten have been widely used for some time. The use of tungsten in making wires having exceptional tensile strength is well known. The metal is also used as contact joints for making and breaking electrical circuits and for engine valves, X-ray apparatus and utensils. Nickel tungsten alloy is widely used in the preparation of surfaces that must resist chemical action. Ferrotungsten is widely used in the manufacture in tool steels and other tungsten steels.

Molybdenum is also widely used as an ingredient of alloys. The addition of very small quantities of molybdenum to steel gives a much tougher product. As little as 1% of molybdenum doubles the strength of low carbon steels at temperatures above 475° C.

In our co-pending application Serial Number 290,214, now Patent No. 3,264,093, we describe a method for preparing rare earth alloys, wherein the alloys contain relatively high levels of rare earth metals, in an electric arc furnace and in the presence of silica. I have found that very valuable tungsten or molybdenum silicon master alloys can be produced by fusing tungsten or molybdenum compounds with metals containing silicon in an electric arc furnace and using a graphite crucible and a graphite electrode. After the reduction is complete, the alloy is separated from the slag and processed into a useful form.

The following materials are examples of molybdenum compounds that can be reduced to alloy by the process of the present invention:

(1) Molybdenum oxide
(2) Molybdic acid
(3) Calcined molybdenum oxide as well as the products from the benefication of the following ores:

(1) Molybdenite ($MoS_2$)
(2) Molybdite ($MoO_3$)
(3) Powellite $Ca(Mo,W)O_4$
(4) Ferrimolybdite $Fe_2O_3 \cdot 3MoO_3 \cdot 8H_2O$ The following materials are examples of tungsten compounds which can be used to prepare tungsten alloys in our process:

(1) Purified scheelite—a calcium tungstate containing about 19.5% calcium oxide and 80.5% tungsten oxide ($WO_3$)
(2) Orthotungstic acid
(3) Metatungstic acid Other tungsten minerals and compounds useful in our process include:

(1) Tungstenite ($WS_2$)
(2) Tungstite ($WO_3 \cdot H_2O$)
(3) Wolframite $(FeMn)WO_4$
(4) Powellite $(Ca(Mo,W)O_4)$
(5) Ferritungstite ($Fe_2O_3 \cdot WO_3 \cdot 6H_2O$)
(6) Ferberite ($FeWO_4$)
(7) Huebnerite ($MnWO_4$)
(8) Anthoinite ($Al(WO_4)(OH) \cdot H_2O$)

As in the case of molybdenum, the products of benefication of the ores are applicable in my process.

My novel process is extremely useful in preparing tungsten or molybdenum silicon master alloys. Silicon, specially as calcium silicon, must be present as a reducing metal which forms alloys with the molybdenum or tungsten. Other metals which can be mixed with the silicon include iron, manganese, nickel, aluminum, magnesium, lithium, beryllium, strontium, barium, titanium and zirconium.

In producing the tungsten or molybdenum silicides containing other metals such as iron manganese and nickel, it is preferred that these materials be present in the alloy portions to about 10 to about 50% of the weight of the alloy. A preferred reducing material is a calcium silicon alloy and particularly one containing about 30% calcium. If crucible damage is encountered, silica (in the form of sand) can be added to the crucible. The reducible tungsten or molybdenum compounds are generally high melting materials, and therefore, the reduction must be carried out in an electric arc furnace. The means employed to produce an electric arc are known to those skilled in the art. The applied potential difference across the electrodes may be either direct current or alternating current.

For the purpose of this invention, it is vital that a "cold-wall" graphite crucible and a graphite electrode be used. A graphite-lined crucible can be used if desired. In a "cold-wall" crucible, the temperatures are progressively cooler from the melt to the outside crucible wall. Conventional electric furnaces which provide heat through the walls of the crucible cannot be employed and heat must be applied directly to the melt. The graphite also aids in promoting the reduction of the molybdenum or tungsten compounds.

The power requirements to be employed are within the purview of a skilled operator in the art. The requirements should be selected to insure that the melt is maintained in a completely molten condition throughout the reaction. An important factor to be considered in determining power requirements is the specific molybdenum or tungsten compound being reduced. Thus, it is obvious that some of the molybdenum or tungsten compounds would require more power for reduction than others.

Another important advantage of the invention is that the entire melting and casting operation may be carried out under atmospheric conditions. There is no necessity to employ a protective atmosphere during reduction.

My invention is further illustrated by the following specific but non-limiting examples.

*Example I*

The following charge is added to an electric arc furnace in a "cold-wall" graphite crucible using a graphite electrode:

| | Grams |
|---|---|
| Molybdic acid | 60 |
| Calcium silicon alloy (30% calcium) | 90 |
| Ferro-manganese (74% Mn) | 12.5 |

The furnace was operated as a direct current arc at 600 amperes and 35 volts for about 5 minutes. After melting a 68 gram ingot was formed. The ingots could readily be broken into any desirable size. The entire melting operation was conducted in the absence of a protective atmosphere.

*Example II*

The procedure from Example I was followed employing the molybdic acid and a calcium silicon alloy containing 30% calcium. The feed material to the graphite crucible in the electric arc was as follows:

| | Grams |
|---|---|
| Molybdic acid | 480 |
| Calcium silicon | 720 |
| Ferro-manganese (74% Mn) | 100 |

The product analyzed 36.2% molybdenum and 5.8% manganese.

Example III

In this example, the following charge is added to the electric arc furnace described in Example I using a "cold-wall" crucible and a graphite electrode:

| | Grams |
|---|---|
| Molybdic acid | 60 |
| Calcium silicon alloy (30% calcium) | 90 |
| Ferro-manganese (74% Mn) | 25 |

The furnace was operated using the same techniques described in Example I. The reaction was partly exothermic with very little fuming. The product was a bright solid alloy at the bottom of the crucible. A crystalline sponge-like material appeared above it. The material in the crucible had a slight slag cover. The slag reacted with the atmosphere and formed a powder.

Example IV

The procedure of Example I was used to prepare an alloy from the following charge:

| | Grams |
|---|---|
| Molybdic acid | 125 |
| Calcium silicon (30% calcium) | 180 |
| Ferro-manganese (74 grams Mn) | 50 |
| Rare earth oxide | 2.5 |

The reaction was exothermic at 900° C. and was super heated to about 2000° C. A total of 334 grams of the product was recovered from this reaction.

Example V

In the following examples, the tungsten alloy was prepared. The following charge was added to the electric arc furnace described in Example I.

| | Grams |
|---|---|
| Scheelite | 200 |
| Calcium silicon alloy (30% calcium) | 300 |
| Ferro-manganese (74% Mn) | 100 |

Scheelite is a calcium tungstate ore containing about 19.5% calcium oxide and 80.5% tungsten oxide. The reaction was very smooth, the top third portion of the material in the crucible was solid, the bottom portion was fritted.

Example VI

The following charge was added to the furnace of Example I using a "cold-wall" graphite crucible:

| | Grams |
|---|---|
| Tungsten oxide ($WO_3$) | 66 |
| Calcium silicon (30% calcium) | 99 |
| Ferro-manganese (70 mesh) (74% Mn) | 15 |

The furnace was operated as a direct current arc at 600 amperes and 35 volts for about 10 minutes. The reaction was very smooth and finally heated to incandescence. The slag separated easily and there was no slag in the metal. A total of 123 grams of alloy was recovered that had a specific gravity of 5.67. The alloy contained 28.1% tungsten, 5.7% manganese, 1.17% iron, 14% calcium and the balance silicon.

Example VII

This example shows the preparation of another tungsten product from scheelite. The reaction was carried out using the equipment described in Example I. The following charge was added to the "cold-wall" graphite crucible:

| | Grams |
|---|---|
| Scheelite | 200 |
| Calcium silicon | 200 |
| Ferro-manganese | 30 |

The reaction proceeded very satisfactorily. The solid product contained some slag. The metal had a specific gravity of 5.31.

Obviously many modifications and variations of the invention may be made without departing from the essence and scope thereof and only such limitations should be applied as are indicated in the appended claims.

What is claimed is:

1. A method of preparing tungsten-silicon and molybdenum-silicon master alloys which comprises fusing a reducible compound selected from the group consisting of tungsten and molybdenum acids, oxides and sulfides with calcium silicon as a reducing metal, the fusion being carried out in an electric arc furnace using a graphite crucible and graphite electrode.

2. The process according to claim 1 wherein the calcium-silicon alloy contains about 30 percent calcium.

3. The process according to claim 1 wherein the reducible compound is selected from the group consisting of molybdenum oxide and molybdic acid.

4. The process according to claim 1 wherein the reducible compound is selected from the group consisting of tungsten oxide, metatungstic acid and orthotungstic acid.

5. The process according to claim 1 wherein the reducing agent contains at least one metal selected from the group consisting of lithium, aluminum, magnesium, beryllium, strontium, barium, titanium, and zirconium.

References Cited by the Examiner

UNITED STATES PATENTS

| 892,212 | 6/1908 | Becket | 75—10 |
|---|---|---|---|
| 930,028 | 8/1909 | Becket | 75—10 |
| 993,338 | 5/1911 | Boericke | 75—135 |
| 1,560,885 | 11/1925 | Walter | 23—204 |
| 2,651,569 | 9/1953 | Loewen et al. | 75—10 |

FOREIGN PATENTS

| 927,283 | 5/1963 | Great Britain. |
|---|---|---|

HYLAND BIZOT, *Primary Examiner.*

H. F. SAITO, *Assistant Examiner.*